United States Patent [19]
Halone, Jr.

[11] Patent Number: 5,214,266
[45] Date of Patent: May 25, 1993

[54] ELECTRIC HEATING ROD ATTACHMENT INSERTABLE INTO ROOF EXHAUST END OF SEWER VENT PIPE TO PREVENT CLOGGING FROM ICE OR SNOW ACCUMULATION

[76] Inventor: John D. Halone, Jr., R.R. #1, Box 182, Rolla, N. Dak. 58367

[21] Appl. No.: 767,221

[22] Filed: Sep. 26, 1991

[51] Int. Cl.$^5$ .................. H05B 3/00; F16L 53/00; E03D 9/04; E04D 13/06
[52] U.S. Cl. ...................... 219/201; 4/218; 4/221; 138/33; 165/47; 219/213; 219/523; 392/485; 392/488; 454/43
[58] Field of Search ............... 219/200, 201, 213, 523; 392/485, 488; 454/43; 165/47; 138/33; 4/218, 221

[56] References Cited

U.S. PATENT DOCUMENTS

| | | | |
|---|---|---|---|
| 1,735,165 | 11/1929 | Hornby | 219/523 |
| 2,464,052 | 3/1949 | Numrich | 219/523 X |
| 3,227,853 | 1/1966 | Gordon | 219/213 |
| 3,557,344 | 3/1969 | De Crosta et al. | 219/523 X |
| 3,582,612 | 6/1971 | Siemianowski | 219/213 |
| 3,823,304 | 7/1974 | Siemianowski | 219/213 |
| 4,524,262 | 6/1985 | Meyer | 219/213 |

FOREIGN PATENT DOCUMENTS 3604517  8/1987  Fed. Rep. of Germany ...... 392/488

OTHER PUBLICATIONS

"Cold Weather Tips For Gutters", Popular Science, vol. 174, No. 2, Feb. 1959 p. 238.

Primary Examiner—Anthony Bartis
Attorney, Agent, or Firm—Robert E. Kleve

[57] ABSTRACT

An electric heating attachment for electrically heating the exterior portion of a sewer vent of a building to keep the vent from clogging from snow and/or ice and frost that may accumulate on the building roof. The attachment has an elongated rod insertable into the vent a with an electric heating tape extending along the length thereof. Laterally extending arms on an upper portion of the rod engage the top edge of the vent to limit the extent of the insertion of the rod into the vent. The section of the rod extending above the lateral arms terminates in a hoop portion having a portion of the heating tape extending therealong to heat the area immediately above the sewer vent to keep this area open to the atmosphere by melting the snow and/or ice above the vent.

3 Claims, 1 Drawing Sheet

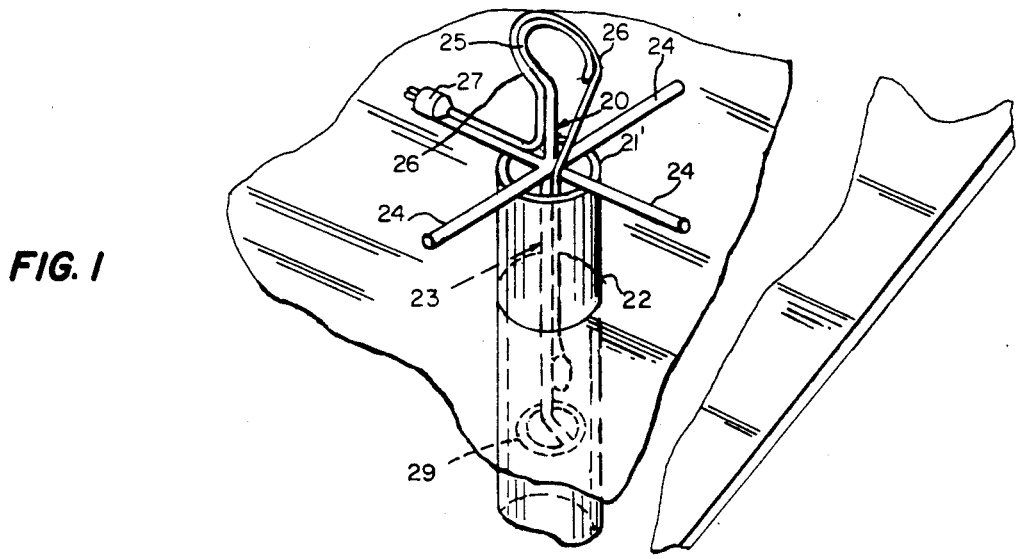
FIG. 1
FIG. 2
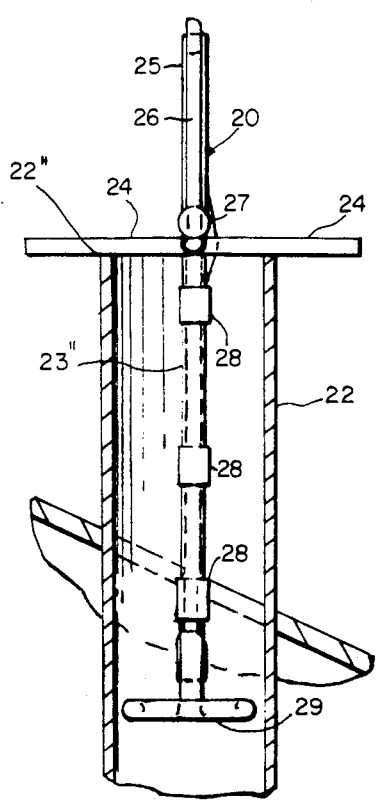
FIG. 3
(ELECTRIC HEATING TAPE)
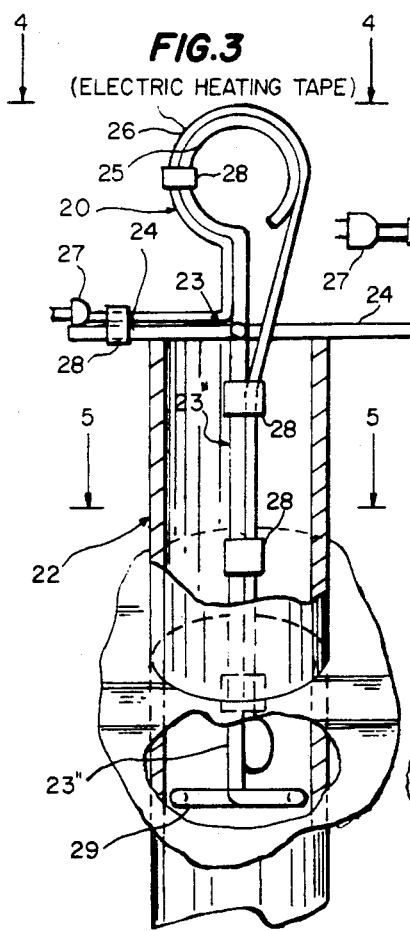
FIG. 4
FIG. 5
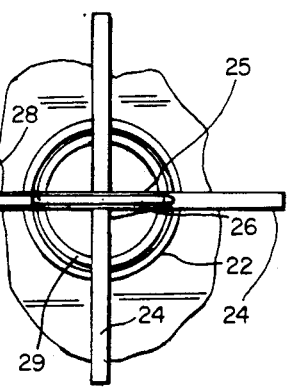

ELECTRIC HEATING ROD ATTACHMENT INSERTABLE INTO ROOF EXHAUST END OF SEWER VENT PIPE TO PREVENT CLOGGING FROM ICE OR SNOW ACCUMULATION

A SUMMARY

This invention relates to heating device for heating sewer vents and the like to prevent them from being clogged by ice and snow.

It is an object of the invention to provide a novel electrically heated rod device for insertion into the sewer vent of a home to electrically heat the vent to prevent it from being clogged by snow and ice and so that it will be open to allow sewer fumes to excape by the vent, which may be easily and quickly installed, and which will heat area immediately surround the top of the vent.

It is another object of the invention to provide a novel heating device for heating a sewer vent, which has means to limit its insertion into the vent, and which may be easily and quickly installed.

It is another object of the invention to provide a novel device which may be quickly and easily installed in the sewer vent outlet on the roof of a home or house to heat the vent from icing or frosting over.

Further objects and advantages of the invention will become apparent as the description proceeds and when taken in conjunction with the accompanying drawing wherein:

Briefly stated the invention comprises an electric heating device for electrically heating the sewer vent outlet pipe of a house. The device has an elongated rod with electriczlly actuated heating tape mounted along the length of the rod. The rod is adapted to be inserted endwise into the roof end of a sewer vent pipe, and a plurality of arms are fixed to an upper portion of the rod which extend laterally outward from the rod beyond the circumference of the pipe whereby the rod may be inserted into the end of the pipe and the lateral arms may rest upon the upper edge of the pipe to support the device near the upper end of the pipe. The device has a looped portion fixed to an upper end of the rod with electrical heating tape mounted along the loop portion whereby the loop portion of the device will extend above the sewer pipe when the rod of the device is inserted into the upper end of the pipe, and the electric heating tape along the loop portion may be electrically energized to heat an area immediately above the pipe to melt any ice and snow above the pipe to keep the pipe open to the atmosphere, while the heating tape along the length of the rod within the pipe may be electrically energized to heat the upper end of the pipe to prevent freezing of any snow or ice in the upper end of the pipe.

BRIEF DESCRIPTION OF THE DRAWING

FIG. 1 is a perspective view of the electric sewer vent heating device shown installed in the sewer vent of a house or home.

FIG. 2 is a side elevational view of the electric heating sewer vent device shown installed in a sewer vent with portions of the vent cut away to reveal the construction of heating device.

FIG. 3 is a front partially sectional view view of the electric heating device shown installed in a sewer vent of a house or home.

FIG. 4 is a cross-sectional view taken along line 4—4 of FIG. 3.

FIG. 5 is a cross-sectional view taken along line 5—5 of FIG. 3.

DESCRIPTION OF PREFERRED EMBODIMENT

Briefly stated, the invention comprises an electric heating device for electrically heating the sewer vent outlet pipe of a home, said device having an elongated rod with electrically actuated heating tape mounted along the length of the rod, said rod being adapted to be inserted lengthwise into the pipe, said device having a plurality of arms fixed to an upper portion of the elongated rod and extending laterally outward beyond the circumference of the pipe whereby the rod may be inserted into the pipe and the lateral arms may rest upon the upper edge of the pipe to support the device near the upper end of the pipe, said device having a looped portion fixed to the upper end of the rod, with electrical heating tape mounted along the loop portion whereby the hoop portion will extend above the sewer pipe when the rod is inserted into the pipe, and the heating tape along the loop portion may be electrically energized to heat the area immediately above the pipe to melt any ice and snow above the pipe to keep the pipe open to the atmosphere, while the heating tape along the length of the rod and within the pipe may be electrically energized to heat the upper end of the pipe to prevent freezing of any snow or ice int he upper end of the pipe.

Referring more particularly to the drawings in FIG. 1, the electrical heating device 20 is shown inserted into the open upper end 22" of the sewer vent pipe 22. The device has a longitudinally extending main rod 23 shown inserted into the vent and plurality of laterally extending rods 24 resting on the top edge of the vent and extending out onto the top edge 22" of the vent 22 to support the device on the top edge of the vent pipe. A hook portion 25 is fixed to the top of the main rod 23. An electrically energized heat tape 26 has an outlet plug 27 attached to one end and the tape extends along one of the lateral arms up about the hook portion 25 and downward along the main rod 23, and its attached to these portions by adhesive tape 28.

A lateral loop portion 29 is formed in the bottom of the rod 23 which loops about in a path laterally of the length of the rod 23. The lateral loop portion 29 has an outer diameter which is slightly smaller than the inside diameter of the vent 22 so as to slide freely inside of the vent 22 longitudinally of the length of the vent, but is large enough to prevent the rod 23 from tilting in the vent at a significant angle to one side or the other of the vent, thus assuring that the rod 23 will be maintained upright in the vent when the device is attached to the vent by be slid downward into the vent as illustrated in FIGS 1-5.

OPERATION

The vent heating device 20 operates as follows:

The ring or loop portion 29 of the rod along with the rest of the rod 22 will be slide down the open upper end 22" of the vent, until the lateral arms 24 of the rod come to rest upon the upper annular edge 22"" of the vent 22, as illustrated in the drawings. The electric plug 27 of the heating tape 26 will be plugged into a suitable extension cord connected in turn to a source of 110 volt voltage to provide current therethrough to the heating tape to cause the heating tape to heat the rod portions it on which is mounted to heat the hook upper portion 25 and the straight portion 23" of the rod 23. The heat along the straight portion 23' of the rod by the heating tape being attached thereto will normally be sufficient to heat the straight rod and the vent along the exposed length of the vent and where the vent connects to the roof to keep the vent open from clogging due to ice snow etc.. The heating tape mounted along the hook portion 25 above the straight portion will normally be sufficient to melt any ice and snow which might gather or accumulate about the loop above the vent, so as to prevent ice and/or snow accumulating above the vent from blocking the vent under normal and even heavy ice and snow accumulation, assuming the ice and snow accumulation does not exceed several feet above the vent. Should it exceed two feet for example, it then may become necessary or desirable to manually remove the snow above the vent above the one foot level, so as to assure that the device will provide sufficient heat to keep the upper open end of the vent 22 open to the atmosphere above.

The device may be plugged into a source of electric current and left plugged in to heat the area surrounding the tape indefinitely within the limits of the tape capacity and length of service.

The rod 23 may be made of steel or other suitable material.

Thus it will be seen that a novel heating device has been provided which can be easily attached to the upper open end of sewer vent of a house or home, by simply sliding the rod portion 23 and loop portion 29 of the device downward into the open upper end of the vent, until the lateral arms 24 of the device come to rest upon the upper edge 22 of the vent, and then plugging the plug outlet of the heating tape on the device to a source of electric current to energize the heating tape to provide heat.

Thus, it will be further seen that the device can be easily and simply made and manufactured with a minimum of parts and labor.

It will be obvious that various changes and departures may be made to the invention without departing from the spirit and scope thereof and accordingly, it is not intended that the invention be limited to that specifically described in the specification or as illustrated in the drawing but only as set forth in the appended claims wherein.

What is claimed is:

1. An electric heating device for attachment to and for electrically heating the portion of a sewer vent exterior of the roof of a building to keep the vent form clogging from snow and/or ice and frost that may accumulate about the vent on the roof of a building, comprising an elongated rod having an electrically activatable heating tape extend-along the length thereof and the rod and tape being adapted to be inserted lengthwise into the sewer vent from the exterior roof opening of the vent, said rod having laterally extending arms fixed to an upper portion thereof and extending laterally of the length of the rod to limit the extent of the insertion into the vent by the engagement of the lateral arms with the top edge of the vent so that the lateral arms rest on the top edge of the vent, said rod having a hook-like portion mounted to the rod above the lateral arms with said heating tape mounted to the hook-like portion, said hook-like portion and heating tape thereon extending above the top of the sewer vent when the rod is inserted into the vent so as to heat the area immediately above the sewer vent to keep this area open to the atmosphere by the heat from the heating tape melting any snow or ice above the vent.

2. An electric heating device for attachment to a sewer vent having an upper open end comprising an elongated rod, electric heating means with portions extending along the length of the rod, support means mounted to the top of the rod with portions of the electric heating means supported by said support means in a loop like manner above the top of the rod, said elongated rod being insertable downward into the upper open end of the vent, means on the rod below the support means and engagable with the vent to limit the insertion of the elongated rod into the vent, said heating means portions along the elongated rod acting to heat the vent with the heating means portions in a loop like manner acting to heat the area above the vent from freezing over the opening into the vent from the atmosphere.

3. An electric heating device for attachment to the upper end portion of a sewer exhaust vent mounted to the roof of a building and wherein the vent has an upper open end comprising an elongated rod, electrically activatable heat tape mounted along the length of the rod, electrically activatable heat tape mounted along the length of the rod, said rod having a portion with at least a portion of said heating tape thereon being insertable into the upper open end of the vent for heating the vent to keep the vent from freezing over from ice or snow accumulation, arm means mounted to the rod above said portion of said rod with said portion of said heating tape and engagable with the vent to limit the length that the portion of the rod with said portion of heating tape thereon is insertable into the vent.

* * * * *